US012011623B1

(12) United States Patent
Power, II et al.

(10) Patent No.: US 12,011,623 B1
(45) Date of Patent: Jun. 18, 2024

(54) SAFETY HARNESS ASSEMBLY

(71) Applicant: Tethrd Inc, Columbia, TN (US)

(72) Inventors: Walter Power, II, Columbia, TN (US); Gregory Alan Godfrey, Richmond Hill, GA (US); Shawn Paul Chadwick, Merrill, WI (US); Carl Eugene Kossuth, III, St. James, MO (US)

( * ) Notice: Subject to any disclaimer, the term of this patent is extended or adjusted under 35 U.S.C. 154(b) by 0 days.

(21) Appl. No.: 18/532,777

(22) Filed: Dec. 7, 2023

(51) Int. Cl.
*A62B 35/00* (2006.01)

(52) U.S. Cl.
CPC ................................ *A62B 35/0012* (2013.01)

(58) Field of Classification Search
CPC ............ A62B 35/0012; A62B 35/0018; A62B 35/0025; A45F 3/22
See application file for complete search history.

(56) References Cited

U.S. PATENT DOCUMENTS 4,101,165 A 7/1978 Hammer
5,010,850 A * 4/1991 Sailer .................. A47D 13/086 182/7
5,050,924 A * 9/1991 Hansen ................ B60P 7/0876 410/97
5,170,521 A * 12/1992 Light .................... A47C 17/84 5/118
5,944,381 A 8/1999 Nguyen
6,035,966 A 3/2000 Lewis
7,063,185 B2 6/2006 Green
8,061,479 B2 11/2011 Harris, Jr.
8,292,028 B2 10/2012 Wise
8,356,691 B2 1/2013 Griffith
8,584,799 B1 11/2013 Dennington
9,320,925 B2 4/2016 Wise
9,808,659 B2 11/2017 Chevalier
10,258,814 B2 4/2019 Casebolt
11,179,584 B2 * 11/2021 Power, II .............. A01M 31/02
11,351,405 B2 * 6/2022 Power, II .............. A01M 31/02
11,623,109 B2 * 4/2023 Power, II ............... A62B 35/04 182/3
11,771,931 B2 * 10/2023 Leach ................ A62B 35/0025 182/3
11,850,452 B2 * 12/2023 Power, II ........... A62B 35/0012
2003/0176122 A1 9/2003 Schwindt
2008/0179136 A1 7/2008 Griffith
2009/0255756 A1 10/2009 Green
2012/0217090 A1 8/2012 Green
(Continued)

FOREIGN PATENT DOCUMENTS

WO WO2018111624 6/2018

*Primary Examiner* — Colleen M Chavchavadze

(57) ABSTRACT

A safety harness assembly to improve the comfort of the user of a saddle which supports a person who is positioned in a tree. The saddle comprises a primary support, which comprises upper and lower straps secured together to form a closed loop. A panel is attached to and extends between the upper and lower straps. The closed loop includes a first lateral edge and a second lateral edge to which is secured a bridge line that in turn can be secured to a tree. A cross strap is attached to and extends between the upper and lower straps. The cross strap retains the primary support in a stowed configuration and is reversibly stretchable to position the primary support in a deployed configuration when the primary support forms a cradle for the buttocks. A secondary support retains the primary support upon the user.

15 Claims, 5 Drawing Sheets

(56) References Cited

U.S. PATENT DOCUMENTS

| | | | | |
|---|---|---|---|---|
| 2018/0369621 | A1* | 12/2018 | Blondeau | A62B 35/0025 |
| 2019/0030708 | A1* | 1/2019 | Holgate | B25J 9/0006 |
| 2020/0324153 | A1* | 10/2020 | Power, II | A47C 3/0255 |
| 2020/0398088 | A1* | 12/2020 | Power, II | A62B 35/0025 |
| 2022/0266072 | A1* | 8/2022 | Power, II | A01M 31/02 |
| 2023/0173312 | A1* | 6/2023 | Gregoire, Jr. | A62B 35/0012 182/9 |

* cited by examiner

SAFETY HARNESS ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to hunting saddle devices and more particularly pertains to a new hunting saddle device to improve the comfort of the user of a saddle and to improve stowage of the hunting saddle device.

(2) Description of Related Art Including Information Disclosed Under 37 CFR 1.97 and 1.98

The prior art relates to hunting saddle devices. The prior art relates to hunting saddle devices that are conventionally used as part of safety harnesses. These safety harnesses are secured to trees to prevent a person from falling from the tree while hunting, for example. The hunting saddle device is used to engage the person's buttocks such that the saddle generally receives the buttocks and typically extends above and below the buttocks. Conventional saddles may comprise upper and lower strapping, which may or may not include cloth or mesh paneling extending between the upper and lower strapping. Such conventional saddles may lack selective sizing features and may not assume a stowed configuration when not in use.

BRIEF SUMMARY OF THE INVENTION

An embodiment of the disclosure meets the needs presented above by generally comprising a safety harness assembly, which is configured to be worn by a user and to be engaged with a bridge line. The safety harness assembly comprises a saddle, which is configured to receive buttocks of the user and which comprises a primary support. The primary support is configured to support a portion of a load held by the saddle when the saddle is fully supporting the user from a tree line. The primary support comprises a lower strap, which is secured to an upper strap to form a closed loop. The closed loop includes a front side, a back side, a first lateral edge and a second lateral edge. The first and second lateral edges are configured to engage a bridge line such that the bridge line can be secured to a tether that is wrapped around a tree. A panel, which comprises a flexible material, is attached to and extends between the upper and lower straps. A receiving section of the panel is defined which traverses a space between the upper and lower straps.

Each cross strap of one or more cross straps is attached to and extends between the upper and lower straps. The cross straps are resiliently stretchable and retain the primary support in a stowed configuration, wherein the upper and lower straps are proximately positioned. The cross straps are reversibly stretchable to position the primary support in a deployed configuration, wherein the lower and upper straps are positionable below and above the buttocks, respectively, with the primary support forming a cradle for the buttocks. A secondary support is attached to the primary support and is configured to retain the primary support on the user.

Another embodiment of the disclosure includes a safety harness assembly, which is configured to be worn by a user and to be engaged with a bridge line. The safety harness assembly comprises a saddle, which is configured to receive buttocks of the user and which comprises a primary support. The primary support is configured to support a portion of a load held by the saddle when the saddle is fully supporting the user from a tree line. The primary support comprises a lower strap, which is secured to an upper strap to form a closed loop. The closed loop includes a front side, a back side, a first lateral edge and a second lateral edge. The first and second lateral edges are configured to engage a bridge line such that the bridge line can be secured to a tether that is wrapped around a tree. A panel, which comprises a flexible material, is attached to and extends between the upper strap and the lower strap. A receiving section of the panel is defined which traverses a space between the upper and lower straps.

One or more first fasteners is attached to a set of cross straps so that each cross strap is fitted with two first fasteners disposed singly proximate to its opposing ends. The set of first fasteners is attached to the upper strap. A set of second fasteners, which are complementary to the first fasteners, is attached to the primary support. The second fasteners are positioned to selectively engage the first fasteners to releasably fasten the cross straps to the primary support, with each cross strap being attached to and extending between a respective first fastener attached to the upper strap and an associated second fastener attached to the lower strap.

A set of sleeves is attached to the primary support, with each cross strap being positioned through a respective sleeve attached to the upper strap and lower strap. The sleeves and the cross straps are positioned on the back side of the primary support with the cross straps bracketing a center line of the primary support equidistant from the first and second lateral edges.

The cross straps are resiliently stretchable and retain the primary support in a stowed configuration, wherein the upper and lower straps are proximately positioned. The cross straps are reversibly stretchable to position the primary support in a deployed configuration, wherein the lower and upper straps are positionable below and above the buttocks, respectively, with the primary support forming a cradle for the buttocks and the cross straps being positioned proximate to or over ischial tuberosity of the user. A secondary support is attached to the primary support and is configured to retain the primary support on the user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
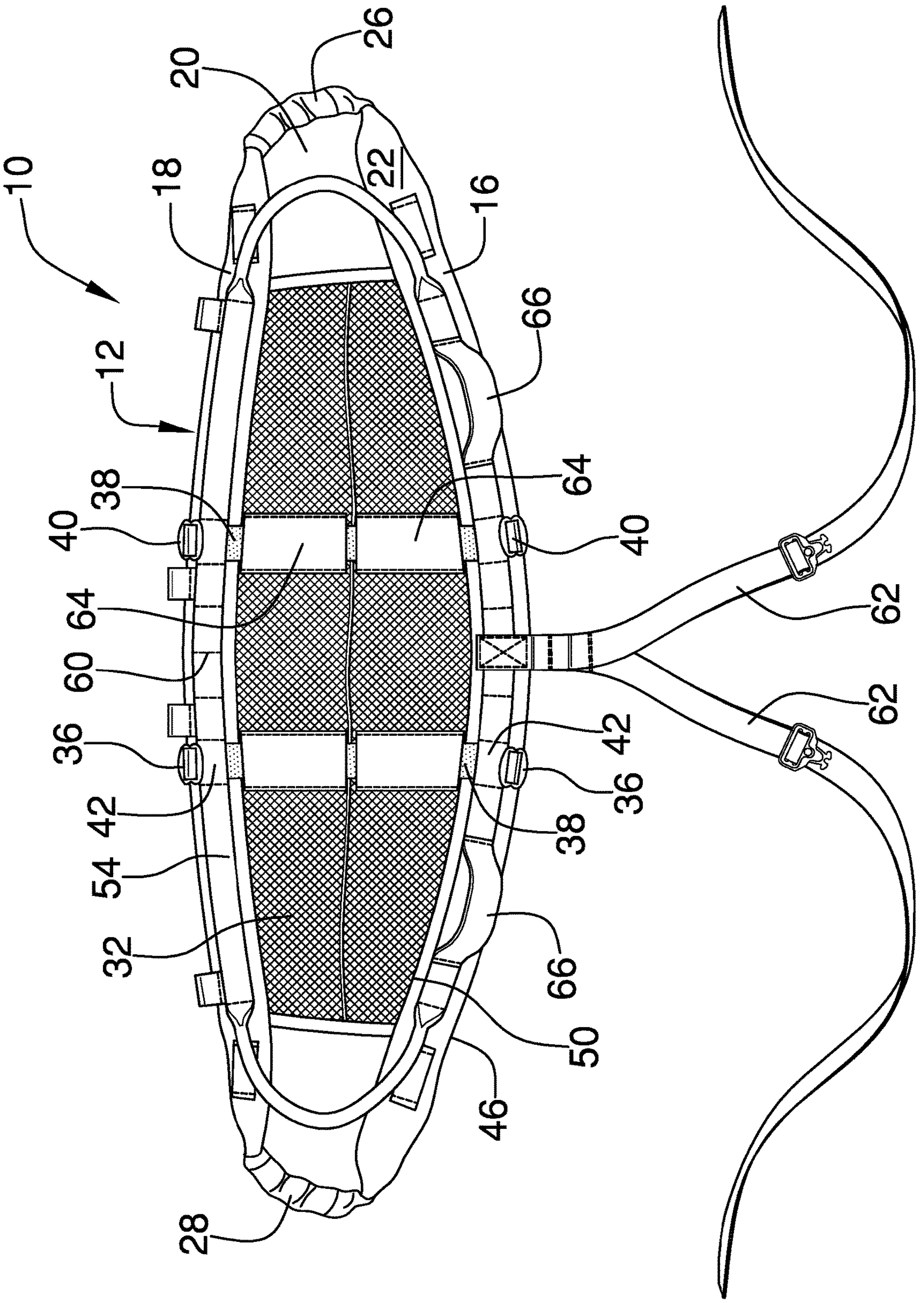
FIG. 1 is a front stowed view of a safety harness assembly according to an embodiment of the disclosure.
Figure 2:
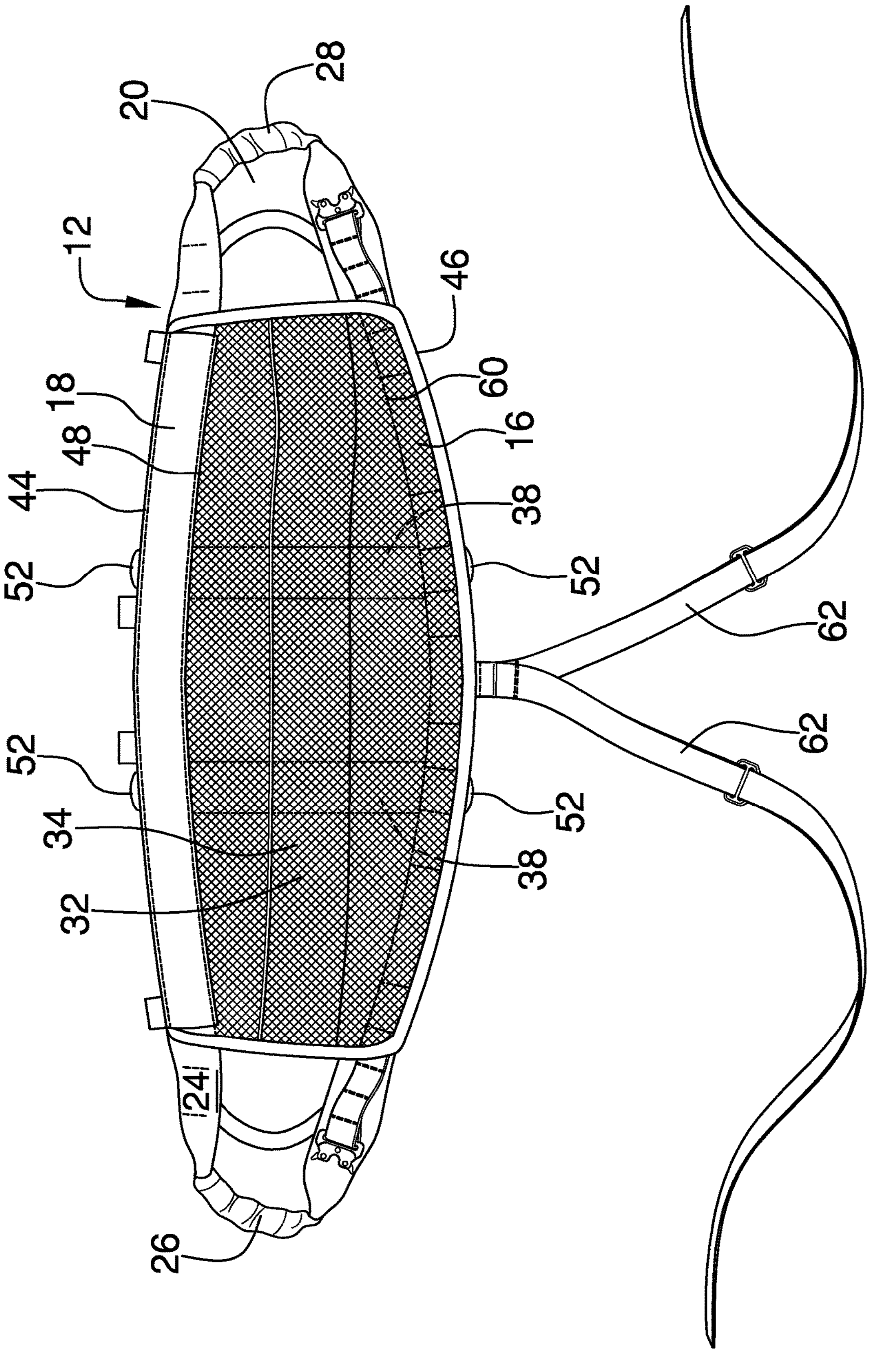
FIG. 2 is a rear stowed view of an embodiment of the disclosure.

With reference now to the drawings, and in particular to FIGS. 1 through 5 thereof, a new hunting saddle device embodying the principles and concepts of an embodiment of the disclosure and generally designated by the reference numeral 10 will be described.

As best illustrated in FIGS. 1 through 5, the safety harness assembly 10, which is configured to be worn by a user and to be engaged with a bridge line generally comprises a saddle 12 that is configured to receive buttocks of the user. The saddle 12 comprises a primary support 14, which is configured to support a portion of a load held by the saddle 12 when the saddle 12 is fully supporting the user from a tree line. The primary support 14 comprises a lower strap 16, which is secured to an upper strap 18 to form a closed loop 20. The closed loop 20 includes a front side 22, a back side 24, a first lateral edge 26, and a second lateral edge 28. It should be understood that use of the terms upper strap 18 and lower strap 16 does not necessitate multiple straps as the closed loop 20 may be comprised of a single unitary strap or multiple straps and that the terms used herein are for explanation purposes only. However, a single unitary strap may be used such that the closed loop 20 functions as a unitary structure. The first lateral edge 26 and the second lateral edge 28 are configured to engage a bridge line 30 such that the bridge line 30 can be secured to a tree.

Figure 3:
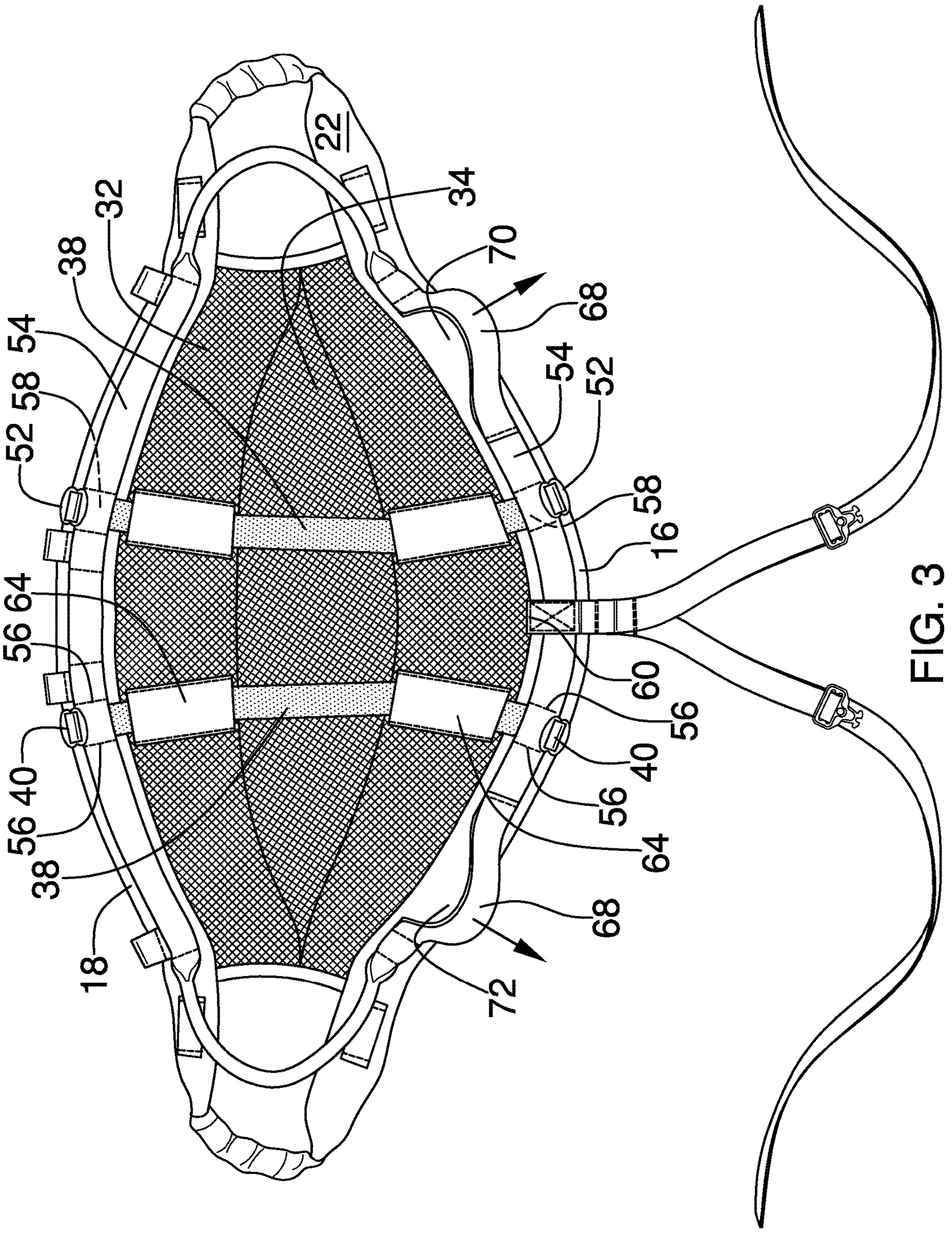
FIG. 3 is a front deployed view of an embodiment of the disclosure.
Figure 4:
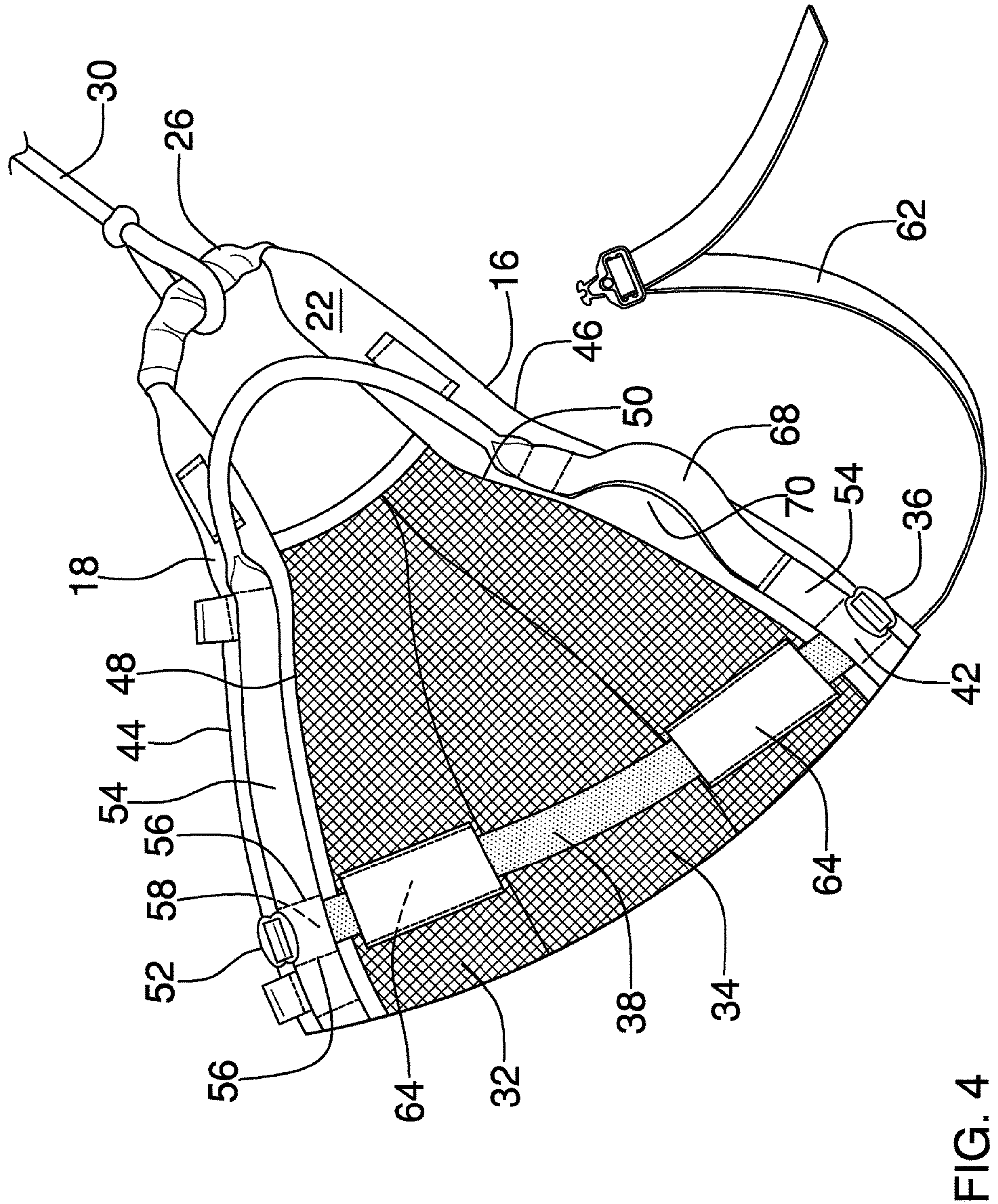
FIG. 4 is a side deployed view of an embodiment of the disclosure.
Figure 5:
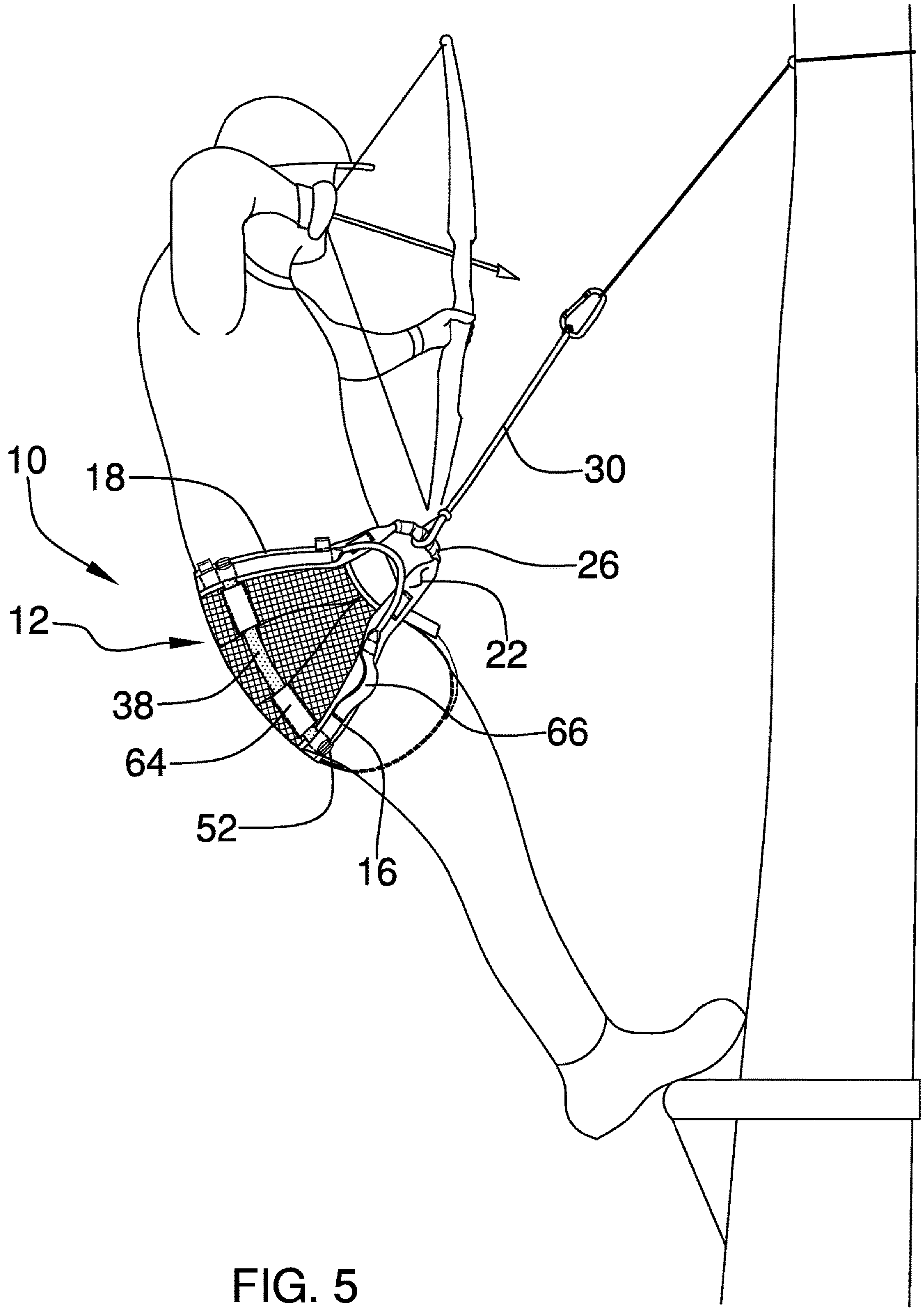
FIG. 5 is an in-use view of an embodiment of the disclosure.

A panel 32, which comprises a flexible material, is attached to and extends between the upper strap 18 and the lower strap 16. A receiving section 34 of the panel 32 is defined and traverses a space between the upper strap 18 and the lower strap 16. A variety of types of panels 32 are used in such safety harness assemblies 10 and are anticipated by the present invention, such as, but not limited to, flexible mesh panels that are collapsible when the primary support 14 is positioned in the stowed configuration as is shown in FIG. 3, a plurality of flexible panels comprising multiple sections, a plurality of semirigid panels comprising multiple sections, which slide over one another as the primary support 14 is positioned in the stowed configuration, or the like.

A set of first fasteners 36 is attached to a set of cross straps 38 so that each cross strap 38 is fitted with first fasteners 36 disposed singly proximate to its opposing ends 40. The present invention, when defining a set of cross straps 38, may comprise a single cross strap 38, two cross straps 38, as is shown in FIG. 1, or three or more cross straps. A set of second fasteners 42, which are complementary to the first fasteners 36, is attached to the primary support 14. The second fasteners 42 are positioned to selectively engage the first fasteners 36 to releasably fasten the set of cross straps 38 to the primary support 14, with each cross strap 38 being attached to and extending between a respective first fastener 36 attached to the upper strap 18 and an associated second fastener 42 attached to the lower strap 16. The present invention also anticipates the cross straps 38 being fixedly attached to the upper strap 18 and to the lower strap 16, such as by means of stitching.

The cross straps 38 being releasably attached to the primary support 14 by the first fasteners 36 and the second fasteners 42 is advantageous as the user is able to replace the cross straps 38, should they become damaged or lose their elasticity. While the cross straps 38 may comprise elastic that is compliant with Naval Publications and Form Center standard MIL-W-5664, even this material is expected to degrade over time and with use, so the ability to replace the cross straps 38 extends the useable life of the safety harness assembly 10.

The respective first fastener 36 is attached to the upper strap 18 proximate to an upper edge 44 of the upper strap 18. The associated second fastener 42 is attached to the lower strap 16 proximate to a lower limit 46 of the lower strap 16. The cross straps 38 being attached proximate to the upper edge 44 of the upper strap 18 and the lower limit 46 of the lower strap 16 provides for a maximum length of the cross straps 38 and thus for maximum potential separation between the upper strap 18 and the lower strap 16. For perspective, a cross strap 38 attached to a lower edge 48 of the upper strap 18 and to an upper limit 50 of the lower strap 16, or some combination thereof, would be relatively short and would limit the separation of the upper strap 18 and the lower strap 16 due to the intrinsic elongation of cross straps 38.

Each first fastener 36 may comprise a webbing slide 52, which is selectively attachable to the cross strap 38. Each second fastener 42 may comprise a cover strap 54, which is attached to upper strap 18 and which extends along the upper limit 44 of upper strap 18. Similarly, each second fastener 42 may comprise a webbing slide 52, which is selectively attachable to the cross strap 38. Each second fastener 42 may comprise a cover strap 54, which is attached to the lower strap 16 and which extends along the lower limit 46 of the lower strap 16. Stitching 56 extends through the cover strap 54 and the lower strap 16, which defines a set of slots 58. Each slot 58 has a width that is complementary to a width of a respective cross strap 38 so that the cross strap 38 is positionable therethrough. The webbing slide 52 contacts the cover strap 54 proximate to the upper limit 44 of the upper strap 18 and the lower limit 46 of the lower strap 16 to prevent the cross strap 38 from sliding through the slot 58.

The cover strap 54 need not be continuous and may comprise strips of webbing (not shown) that are stitched by their opposed edges to the upper strap 18 or to the lower strap 16. One advantage of the first fasteners 36 comprising webbing slides 52 is that the webbing slides 52 can be used to selectively lengthen and to shorten the cross straps 38, allowing users having buttocks of a variety of sizes to adjust the safety harness assembly 10 for their maximum comfort. Another advantage of the first fasteners 36 comprising webbing slides 52 is that the lengths of the cross straps 38 can be shortened over time as the cross straps 38 slowly lose their elasticity, thereby allowing the user to maintain a maximum level of comfort, optimized stowage, and to achieve a longer usable lifetime for the cross straps 38. The present invention anticipates other fastening means to attach the cross strap 38 to upper strap 18 and lower strap 16 using buckles, clamps, clips, or the like. The present invention also anticipates other fastening means to prevent the cross strap 38 from sliding through the slot 58, such as, but not limited to, the second fasteners 42 comprising compression type clamps or clips, in which case the first fasteners 36 would not be required, the second fasteners 42 comprising D-rings, or the like.

The cross straps 38 are resiliently stretchable and retain the primary support 14 in a stowed configuration, as is shown in FIG. 1, wherein the upper strap 18 and the lower strap 16 are proximately positioned. The cross straps 38 being reversibly stretchable allows positioning of the primary support 14 in a deployed configuration, wherein the lower strap 16 and the upper strap 18 are positionable below and above the buttocks, respectively, with the primary support 14 forming a cradle for the buttocks. A secondary support 62 is attached to the primary support 14 and is configured to retain the primary support 14 on the user.

The cross straps 38 bracket a center line 60 of the primary support 14, which is equidistant from the first lateral edge 26 and the second lateral edge 28, and thus are being positioned proximate to or over ischial tuberosity of the user. Thus positioned, the two cross straps 38 are configured to provide additional support to the buttocks of the user. With the cross straps 38, being positioned near the center line 60, they also bracket a point of maximum separation of the upper strap 18 and the lower strap 16 when the primary support 14 is in the deployed configuration. Rebounding of the cross straps 38 thus minimizes a gap between the upper strap 18 and the lower strap 16 upon the primary support 14 returning to the stowed configuration.

Retaining the primary support 14 in the stowed configuration when the safety harness assembly 10 is not in use is advantageous because the safety harness assembly 10 is more compact which improves the mobility of the user and minimizes the possibility of the safety harness assembly 10 being damaged during transport to a selected hunting site and climbing of a hunting location through dense vegetation.

A set of sleeves 64 is attached to the primary support 14, with each cross strap 38 being positioned through a respective sleeve 64 attached to the upper strap 18 and through an associated sleeve 64 attached to the lower strap 16, as is shown in FIG. 3. The sleeves 64 and the cross straps 38 are positioned on the front side 22 of the primary support 14. The sleeves 64 and the cross straps 38 being positioned on the front side 22 of the primary support 14 prevents their direct contact with the user, thereby minimizing functional interference of the cross straps 38 with the user and maximizing comfort of the user. As is shown in FIG. 1, the sleeves 64 substantially cover the cross straps 38 while the cross straps 38 are retaining the primary support 14 in the stowed configuration, thereby reducing abrasive wear on the cross straps 38 and a potential for snagging as the user navigates terrain to a selected hunting site and climbs a tree.

As is shown in FIG. 3, a pair of handles 66 is attached to lower limit 46 of the lower strap 16. The handles 66 are positioned singly proximate to the first lateral edge 26 and the second lateral edge 28 and are configured to be pulled downwardly to extend the primary support 14 from the stowed configuration to the deployed configuration. Each handle may comprise a grip strap 68, which has opposed ends 72 that are attached to the lower strap 16 to define a finger loop 70. Each finger loop 70 is configured for insertion of one or more digits of an associated hand of the user, positioning the user to pull downwardly on the finger loop 70 to extend the primary support 14 from the stowed configuration to the deployed configuration. The present invention anticipates the grip strap 68 being a section of the cover strap 54. The present invention also anticipates the handles 66 comprising other grasping means, such as, but not limited to, straps attached by a single end to the lower strap 16, D-rings hingedly attached to the lower strap 16, or the like.

In use, the safety harness assembly 10 is donned by a user with the primary support 14 positioned at or above the buttocks of the user. Thus positioned, the safety harness assembly 10 is comfortably positioned upon the user and does not significantly impede the user's ability to walk or climb a tree. The cross straps 38 retain the primary support 14 in the stowed configuration as the user navigates to a hunting site and climbs a tree. Once positioned in the tree, the user can grasp the handles 66 and pull downwardly to deploy the saddle 12, such that the lower strap 16 is positioned below the buttocks and the safety harness assembly 10 is configured to support the user in a conventional manner.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A safety harness assembly configured to be worn by a user and engaged with a bridge line, the safety harness assembly comprising a saddle configured to receive buttocks of the user, the saddle comprising:

a primary support configured to support a portion of a load held by the saddle when the saddle is fully supporting the user from a tree line, the primary support comprising:

an upper strap;

a lower strap secured to the upper strap to form a closed loop, the closed loop including a front side, a back side, a first lateral edge and a second lateral edge, the first and second lateral edges being configured to engage a bridge line such that the bridge line can be secured to a tree;

a cross strap being attached to and extending between the upper strap and the lower strap, the cross strap being resiliently stretchable such that the cross strap retains the primary support in a stowed configuration wherein the upper strap and the lower strap are proximately positioned, the cross strap being reversibly stretchable to position the primary support in a deployed configuration wherein the lower strap and the upper strap are positionable below and above the buttocks, respectively, such that the primary support forms a cradle for the buttocks;

a secondary support being attached to the primary support and being configured to retain the primary support on the user;

a set of first fasteners being attached to the cross strap and disposed proximate to opposing ends of the cross strap; and a set of second fasteners being attached to the primary support, the second fasteners being complementary to the first fasteners such that the second fasteners are positioned to selectively engage the first fasteners to releasably fasten the cross strap to the primary support with the cross strap being attached to and extending between a respective first second fastener attached to the upper strap and an associated second second fastener attached to the lower strap.

2. The safety harness assembly of claim 1, further including a panel comprising a flexible material being attached to and extending between the upper strap and the lower strap, a receiving section of the panel is defined which traverses a space between the upper strap and the lower strap.

3. The safety harness assembly of claim 1, wherein:

the respective first second fastener is attached to the upper strap proximate to an upper edge of the upper strap; and the associated second second fastener is attached to the lower strap proximate to a lower limit of the lower strap.

4. The safety harness assembly of claim 3, wherein:

each first fastener comprises a webbing slide selectively attachable to the cross strap;

each second fastener comprises a cover strap attached to the lower strap and extending along the lower limit of the lower strap; and stitching extending through the cover strap and the lower strap defining a set of slots, each slot having a width complementary to a width of a respective cross strap, such that the cross strap is positionable therethrough, wherein the webbing slide contacts the cover strap proximate to the lower limit of the lower strap to prevent the cross strap from sliding through the slot.

5. The safety harness assembly of claim 2, further including a set of sleeves attached to the primary support, the cross strap being positioned through one of said set of sleeves attached to the upper strap and one of said set of sleeves attached to the lower strap.

6. The safety harness assembly of claim 5, wherein the set of sleeves and the cross straps are positioned on the front side of the primary support.

7. The safety harness assembly of claim 1, wherein the cross strap comprises a plurality of cross straps bracketing a center line of the primary support equidistant from the first lateral edge and the second lateral edge, such that the plurality of cross straps are positioned proximate to or over ischial tuberosity of the user upon donning of the saddle.

8. The safety harness assembly of claim 1, further including at least one handle attached to lower limit of the lower strap and being positioned proximate to the first lateral edge or the second lateral edge, wherein the at least one handle is configured to be pulled downwardly to extend the primary support from the stowed configuration to the deployed configuration.

9. The safety harness assembly of claim 8, wherein the at least one handle comprises a grip strap having opposed ends attached to the lower strap to define a finger loop, wherein the finger loop is configured for insertion of one or more digits of an associated hand of the user and positioning the user to pull downwardly on the finger loop to extend the primary support from the stowed configuration to the deployed configuration.

10. A safety harness assembly configured to be worn by a user and engaged with a bridge line, the safety harness assembly comprising a saddle configured to receive buttocks of the user, the saddle comprising:

a primary support configured to support a portion of a load held by the saddle when the saddle is fully supporting the user from a tree line, the primary support comprising:

an upper strap;

a lower strap secured to the upper strap to form a closed loop, the closed loop including a front side, a back side, a first lateral edge and a second lateral edge, the first and second lateral edges being configured to engage a bridge line such that the bridge line can be secured to a tree;

a panel comprising a flexible material being attached to and extending between the upper strap and the lower strap, a receiving section of the panel is defined which traverses a space between the upper strap and the lower strap; and a set of cross straps, each cross strap being attached to and extending between the upper strap and the lower strap, the set of cross straps being resiliently stretchable such that the set of cross straps retains the primary support in a stowed configuration, wherein the upper strap and the lower strap are proximately positioned, the set of cross straps being reversibly stretchable to position the primary support in a deployed configuration, wherein the lower strap and the upper strap are positionable below and above the buttocks, respectively such that the primary support forms a cradle for the buttocks;

a set of first fasteners attached to the set of cross straps such that each cross strap is fitted with first fasteners disposed singly proximate to opposing ends of the cross strap; and a set of second fasteners attached to the primary support, the second fasteners being complementary to the first fasteners such that the second fasteners are positioned to selectively engage the first fasteners to releasably fasten the set of cross straps to the primary support with each cross strap being attached to and extending between a respective first second fastener attached to the upper strap and an associated second second fastener attached to the lower strap.

11. The safety harness assembly of claim 10, wherein:

each first fastener comprises a webbing slide selectively attachable to the cross strap;

each second fastener comprises a cover strap attached to the lower strap and extending along the lower limit of the lower strap; and stitching extending through the cover strap and the lower strap defining a set of slots, each slot having a width complementary to a width of a respective cross strap, such that the cross strap is positionable therethrough, wherein the webbing slide contacts the cover strap proximate to the lower limit of the lower strap to prevent the cross strap from sliding through the slot.

12. The safety harness assembly of claim 10, wherein the set of cross straps is comprising a plurality cross straps bracketing a center line of the primary support equidistant from the first lateral edge and the second lateral edge, such that the cross straps are positioned proximate to or over ischial tuberosity of the user upon donning of the saddle.

13. The safety harness assembly of claim 10, further including a set of sleeves attached to the primary support, such that each cross strap is positioned through a respective sleeve attached to the upper strap and an associated sleeve attached to the lower strap, the set of sleeves and the set of cross straps being positioned on the front side of the primary support.

14. The safety harness assembly of claim 10, further including a set of handles attached to lower limit of the lower strap and being positioned singly proximate to the first lateral edge and the second lateral edge, wherein the handle are configured to be pulled downwardly to extend the primary support from the stowed configuration to the deployed configuration.

15. The safety harness assembly of claim 14, wherein each handle comprises a grip strap having opposed ends attached to the lower strap defining a finger loop, wherein each finger loop is configured for insertion of one or more digits of an associated hand of the user, positioning the user to pull downwardly on the finger loop to extend the primary support from the stowed configuration to the deployed configuration.

* * * * *